(12) United States Patent
Chiu et al.

(10) Patent No.: US 10,716,422 B2
(45) Date of Patent: Jul. 21, 2020

(54) DISPOSABLE LIQUID-BINDING FLOOR MAT

(71) Applicants: Web-Pro Corporation, Kaohsiung (TW); Wen-Tung Chang, New Taipei (TW)

(72) Inventors: Cheng-Chung Chiu, Kaohsiung (TW); Wen-Tung Chang, New Taipei (TW)

(73) Assignees: WEB-PRO CORPORATION, Kaohsiung (TW); Wen-Tung Chang, New Taipei (TW)

( * ) Notice: Subject to any disclaimer, the term of this patent is extended or adjusted under 35 U.S.C. 154(b) by 100 days.

(21) Appl. No.: 16/102,234

(22) Filed: Aug. 13, 2018

(65) Prior Publication Data

US 2019/0261801 A1 Aug. 29, 2019

(30) Foreign Application Priority Data

Feb. 26, 2018 (TW) .............................. 107202588 U

(51) Int. Cl.
*B32B 7/12* (2006.01)
*A47G 27/02* (2006.01)
(Continued)

(52) U.S. Cl.
CPC .......... *A47G 27/0206* (2013.01); *B32B 5/022* (2013.01); *B32B 7/12* (2013.01);
(Continued)

(58) Field of Classification Search
CPC .......... A47G 27/0206; B32B 2307/726; B32B 2307/728; B32B 2471/04; B32B 27/32; B32B 5/022; B32B 7/12
See application file for complete search history.

(56) References Cited

U.S. PATENT DOCUMENTS

2006/0246798 A1* 11/2006 Reneker ................ A61F 13/531
442/59
2007/0039235 A1* 2/2007 Yoshida ................. A01N 25/00
43/124
(Continued)

FOREIGN PATENT DOCUMENTS

| TW | M403972 U | 5/2011 |
| TW | M406403 U | 7/2011 |
| TW | M505873 U | 8/2015 |

*Primary Examiner* — Lawrence D Ferguson
(74) *Attorney, Agent, or Firm* — Muncy, Geissler, Olds & Lowe, P.C.

(57) ABSTRACT

A disposable liquid-binding floor mat includes a water penetration layer, a water absorption layer, a water-proof layer and a self-adhesive layer. The water penetration layer is a thin piece of non-woven fabric and is superimposed on the water absorption layer. The water absorption layer is made of a hydrophilic thin plate and is superimposed between the water penetration layer and the water-proof layer. The water-proof layer is made of a water-proof film material and is superimposed between the water absorption layer and the self-adhesive layer. The self-adhesive layer is made of a self-adhesive material and is superimposed below the water-proof layer. The water penetration layer, the water absorption layer, the water-proof layer and the self-adhesive layer are bonded as an integrated non-sealed edge structure, and a deodorant is added into the water absorption layer.

9 Claims, 7 Drawing Sheets

(51) Int. Cl.
*B32B 5/02* (2006.01)
*B32B 27/32* (2006.01)

(52) U.S. Cl.
CPC ......... *B32B 27/32* (2013.01); *B32B 2307/726* (2013.01); *B32B 2307/728* (2013.01); *B32B 2471/04* (2013.01)

(56) References Cited

U.S. PATENT DOCUMENTS

| | | | |
|---|---|---|---|
| 2014/0230484 A1* | 8/2014 | Yavitz | A47G 19/2288 62/457.4 |
| 2016/0279914 A1* | 9/2016 | Rose | B32B 27/12 |
| 2017/0136731 A1* | 5/2017 | Rose | B32B 27/08 |

* cited by examiner

DISPOSABLE LIQUID-BINDING FLOOR MAT

BACKGROUND OF THE INVENTION a) Field of the Invention

The present invention relates to a floor mat which is used in an environment where a dry space should be kept separating from a moist space, such as in a family, a public place or on a transportation vehicle. More particularly, the present invention discloses a deodorizing, liquid-binding and self-adhesive floor mat that is used in an access, a kitchen or a lavatory which gets wet easily.

b) Description of the Prior Art

A lavatory or a kitchen in a family or a public area gets wet often, and in a men's room in a public place like a business place, there will be usually dropped urine on the floor beside a urinal. In addition, the floor under a sink can be often seen with water drops which were shaken off by a user after washing his or her hands. As it will always require a janitor to wipe off stains on the floor with a mop periodically, the manpower will be wasted. Furthermore, when the janitor is cleaning the floor, people cannot use the facility. However, the existing floor mat developed is still not equipped with aesthetics, deodorization, water absorption, self-adhesiveness and compactness to satisfy the needs on the market.

In a prior art, a replaceable floor mat as disclosed in a Taiwanese Patent Publication No. M406403, includes a cleaning layer and a mat. The cleaning layer is composed of thermoplastic rubber, resin and a binding agent which are mixed and shaped, so that the cleaning layer is equipped with self-adhesiveness and extensible elasticity. The mat includes a top surface and the cleaning layer is disposed on the top surface. Accordingly, the user can fix the floor mat on the floor to remove dust particles from a surface of an object like a sole with the adhesive cleaning layer. In addition, as the compositions of the cleaning layer are washable without destroying the adhesiveness, the floor mat can be used repeatedly. On the other hand, another replaceable floor mat as disclosed in a Taiwanese Patent Publication No. M403972, is a separable, replaceable and renewable floor mat including primarily a lower-layer fixing unit and an upper-layer replaceable unit. The lower-layer fixing unit includes a skid-proof layer and a release film which is disposed on the skid-proof layer. In addition, the peripheral locations of the skid-proof layer and the release film are framed and positioned with a soft frame body. The upper-layer replaceable unit includes a pressure-sensitive adhesive and a carpet layer which is disposed on the pressure-sensitive adhesive, wherein the pressure-sensitive adhesive allows the release film to be attached on and peeled off from the lower-layer fixing unit. By this innovative and unique design, the replaceable floor mat can achieve the effect of oil absorption, water absorption and skid-proof. In addition, a dirty upper-layer replaceable unit can be separated and replaced to renew with another upper-layer replaceable unit, thereby achieving the practicality and advancement of saving the materials of the floor mat. All the prior arts will need a basin-like object to collect liquid, and the basin-like object should be covered with an absorption object. However, as the basin-like object is provided with a certain height, when the user steps on the floor mat, he or she can kick on the basin-like object very easily. Therefore, it is not convenient in using the floor mat that the user will not want to step on and use the floor mat.

In another prior art, a water-absorption and shock-proof floor mat as disclosed in a Taiwanese Patent Publication No. M505873, is a non-toxic mat composed of a complex layer, a cloth layer and a skid-proof layer and can be adapted to achieve the effect of water absorption, oil absorption, water-proof, oil-proof, shock absorption and skid-proof. Therefore, the floor mat is multipurpose. However, the floor mat is applied primarily in sports or a 3C (Computing, Communication and Consumer) shock-absorption mat, wherein the skid-proof layer should be provided with a certain thickness to absorb the vibration from a stride of an athlete or from a 3C product. As the skid-proof layer is high, it can still cause the user to easily kick on the edge of the floor mat to flip the floor mat when the user is stepping on the floor mat, which is not very suitable for use in a place getting wet easily in a family or a public area.

The present inventor has been working on the business of building materials and sanitary materials for many years and knows very clearly that a wet floor in a family or a public area will need manpower for cleaning to keep the environment dry and clean. However, the existing floor mat is still provided with the drawbacks that it is not cleaned easily, not paved easily, not pretty and can be easily kicked off due to the difference in height and these shortcomings need to be solved altogether.

SUMMARY OF THE INVENTION

Accordingly, the present invention discloses a disposable liquid-binding floor mat which comprises a water penetration layer, a water absorption layer, a water-proof layer and a self-adhesive layer. The water penetration layer is a thin piece of non-woven fabric and is superimposed on the water absorption layer. The water absorption layer is made of a hydrophilic thin plate and is superimposed between the water penetration layer and the water-proof layer. The water-proof layer is made of a water-proof film and is superimposed between the water absorption layer and the self-adhesive layer. The self-adhesive layer is made of a self-adhesive material and is superimposed below the water-proof layer. The present invention is characterized in that the water penetration layer, the water absorption layer, the water-proof layer and the self-adhesive layer are combined into an integrated non-sealed edge structure, and a deodorant is added into the water absorption layer. The water penetration layer is provided with a printed or mixed dark camouflage pattern, allowing a surface of the water penetration layer to manifest an interlaced figure, with the interlaced color between the color when the surface of the water penetration layer gets wet and the color when the surface of the water penetration layer gets dry to reduce the sense of dirtiness. In addition, the dominant tone of the surface color of the water penetration layer is the dark color to intensify the visual effect that prevents the user from observing and finding out traces of watermarks easily. The dark camouflage pattern is a cloth-imitation pattern, a floor-tile-imitation pattern or a carpet-imitation pattern. The area of the water absorption layer is smaller than or equal to that of at least one of the water penetration layer, the water-proof layer or the self-adhesive layer. The water-proof film of the water-proof layer is made of water-proof polyethylene, water-proof polypropylene, moisture-permeable and water-proof polyethylene or moisture-permeable and water-proof polypropylene. The self-adhesive material of the self-adhesive layer is at least a coating on a corner-intensified area, a local area and a full area. The water penetration layer, the water absorption layer, the water-proof layer and the self-adhesive layer are combined as an integrated structure, and at least a structural adhesive layer is disposed between one layer and the other. The structural adhesive layer is a partially or fully molten structure or an adhesive structure. The appearance of the floor mat is in a shape that at least an edge end thereof is opened or not opened. The floor mat is a plate or plural floor mats are rolled into a coil, with a tear line being disposed along the length between two neighboring floor mats. The floor mat is a rectangle or a round rectangle. Furthermore, an aromatic is added into the water absorption layer. The present invention is provided with the water penetration layer with the printed pattern on the surface, preventing the user from finding out the wet watermarks easily. The inner water absorption layer absorbs environment liquid and deodorizes. The bottom water-proof layer and self-adhesive layer can isolate liquid and be self-adhesive. Therefore, the present invention is functional in aesthetics, deodorization, water absorption, self-adhesiveness and compactness, which is different from the prior arts.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
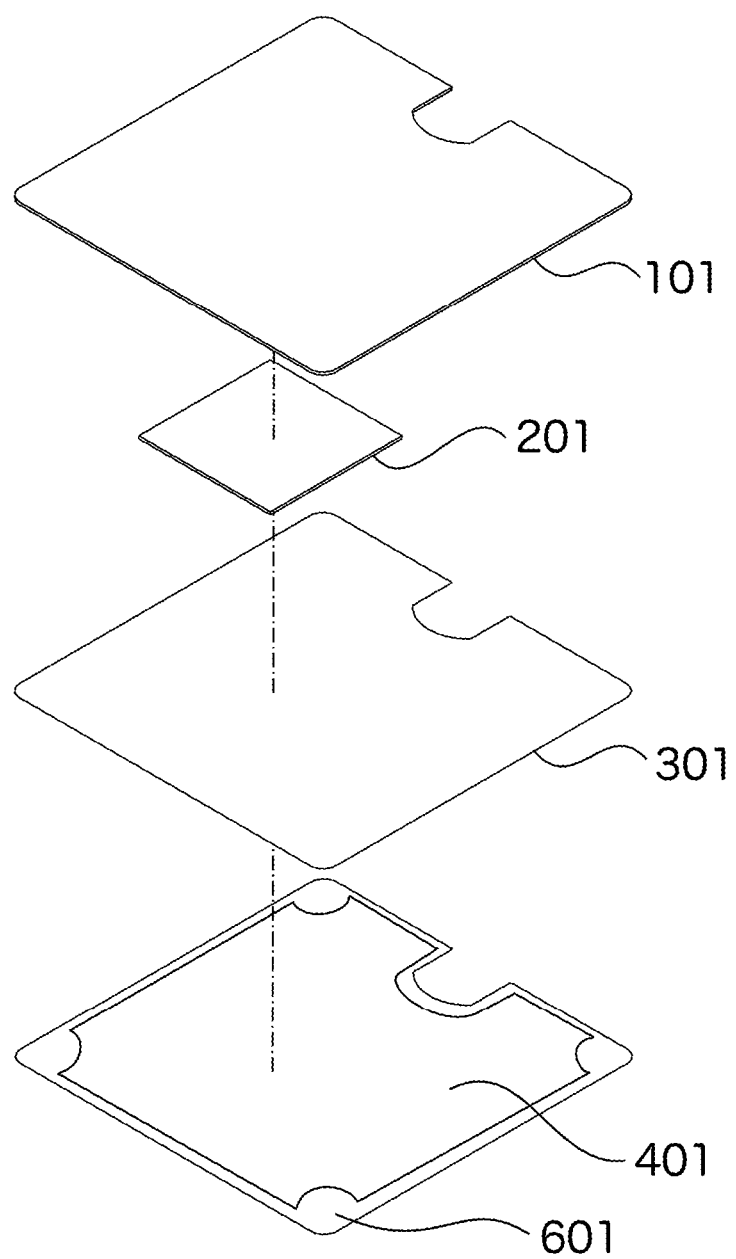
FIG. 1 shows an exploded view of a disposable liquid-binding floor mat in a shape of a round rectangle, according to the present invention.
Figure 2:
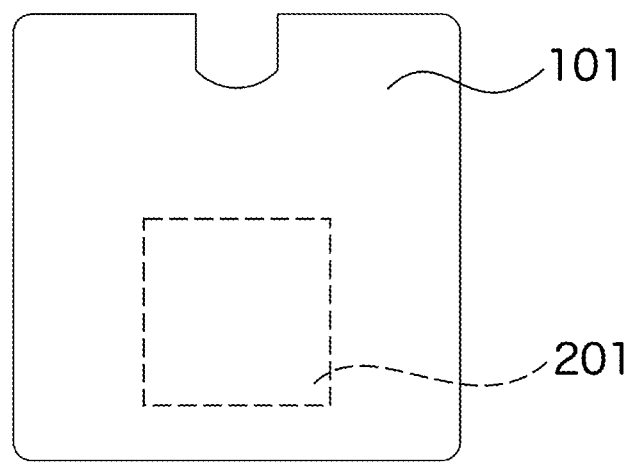
FIG. 2 shows a top view of the disposable liquid-binding floor mat in a shape of a round rectangle, according to the present invention.

Referring to FIG. 1 and FIG. 2, it shows an exploded view and a top view of a disposable liquid-binding floor mat in a shape of a round rectangle, according to the present invention. The floor mat comprises a water penetration layer 101, a water absorption layer 201, a water-proof layer 301, and a self-adhesive layer 401. The water penetration layer 101 is a thin piece of non-woven fabric and is superimposed on the water absorption layer 201. The water absorption layer 201 is made of a hydrophilic thin plate and is superimposed between the water penetration layer 101 and the water-proof layer 301. The water-proof layer 301 is made of a water-proof film and is superimposed between the water absorption layer 201 and the self-adhesive layer 401. The self-adhesive layer 401 is made of a self-adhesive material and is superimposed below the water-proof layer 301. The present invention is characterized in that the water penetration layer 101, the water absorption layer 201, the water-proof layer 301 and the self-adhesive layer 401 are bonded as an integrated non-sealed edge structure, with peripheries of each layer having no leak-proof sealing treatment to reduce the processing of production. In addition, a deodorant is added into the water absorption layer 201. In FIG. 2, the dashed part shows that the area of the water absorption layer 201 is smaller than that of at least one of the water penetration layer 101, the water-proof layer 301 or the self-adhesive layer 401. The area of the water absorption layer 201 is limited to a specific region to intensify absorption and reduce the use of the water absorption material, which can save the cost and reduce the waste of resources. The water penetration layer 101 is provided with a surface printed or interior printed dark camouflage pattern, and the dark camouflage pattern is a cloth-imitation pattern, a floor-tile-imitation pattern or a carpet-imitation pattern. The water-proof film of the water-proof layer 301 is made of water-proof polyethylene, water-proof polypropylene, moisture-permeable and water-proof polyethylene or moisture-permeable and water-proof polypropylene. The self-adhesive material of the self-adhesive layer 401 is at least a coating on a corner-intensified area 601 (such as the intensified self-adhesive coating on an area surrounding the edge in FIG. 1), a local area or a full area. The floor mat is characterized in that the appearance is in a shape that at least an edge end is opened or not opened. The floor mat can be a plate or plural floor mats are rolled into a coil, with a tear line being disposed along the length between two neighboring floor mats. The floor mat is a rectangle or a round rectangle. Furthermore, an aromatic is added into the water absorption layer 201.

Figure 3:
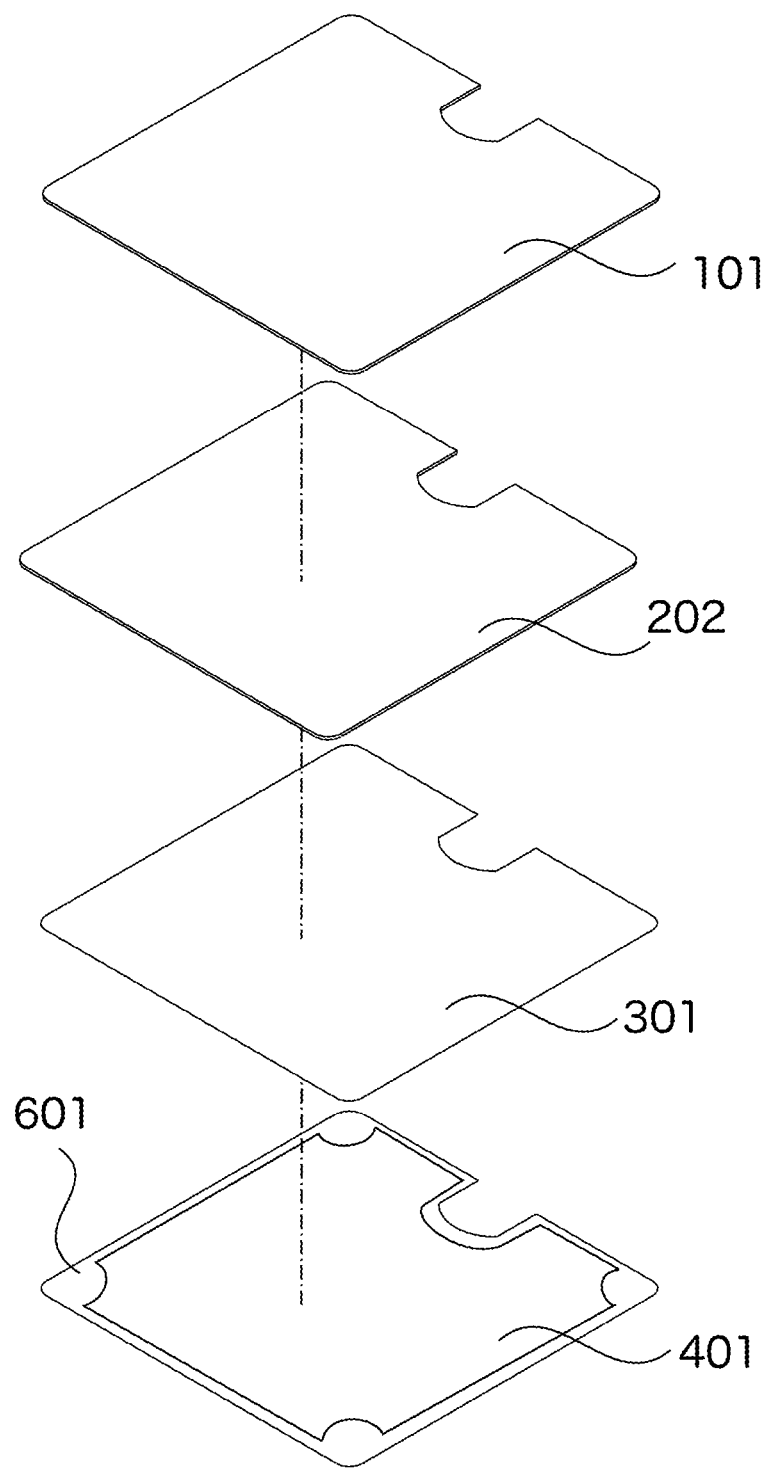
FIG. 3 shows an exploded view of another embodiment of the disposable liquid-binding floor mat in a shape of a round rectangle, according to the present invention.
Figure 4:
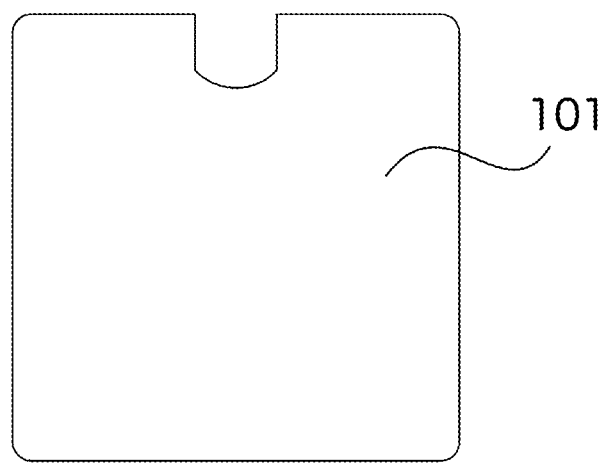
FIG. 4 shows a top view of another embodiment of the disposable liquid-binding floor mat in a shape of a round rectangle, according to the present invention.
Figure 5:
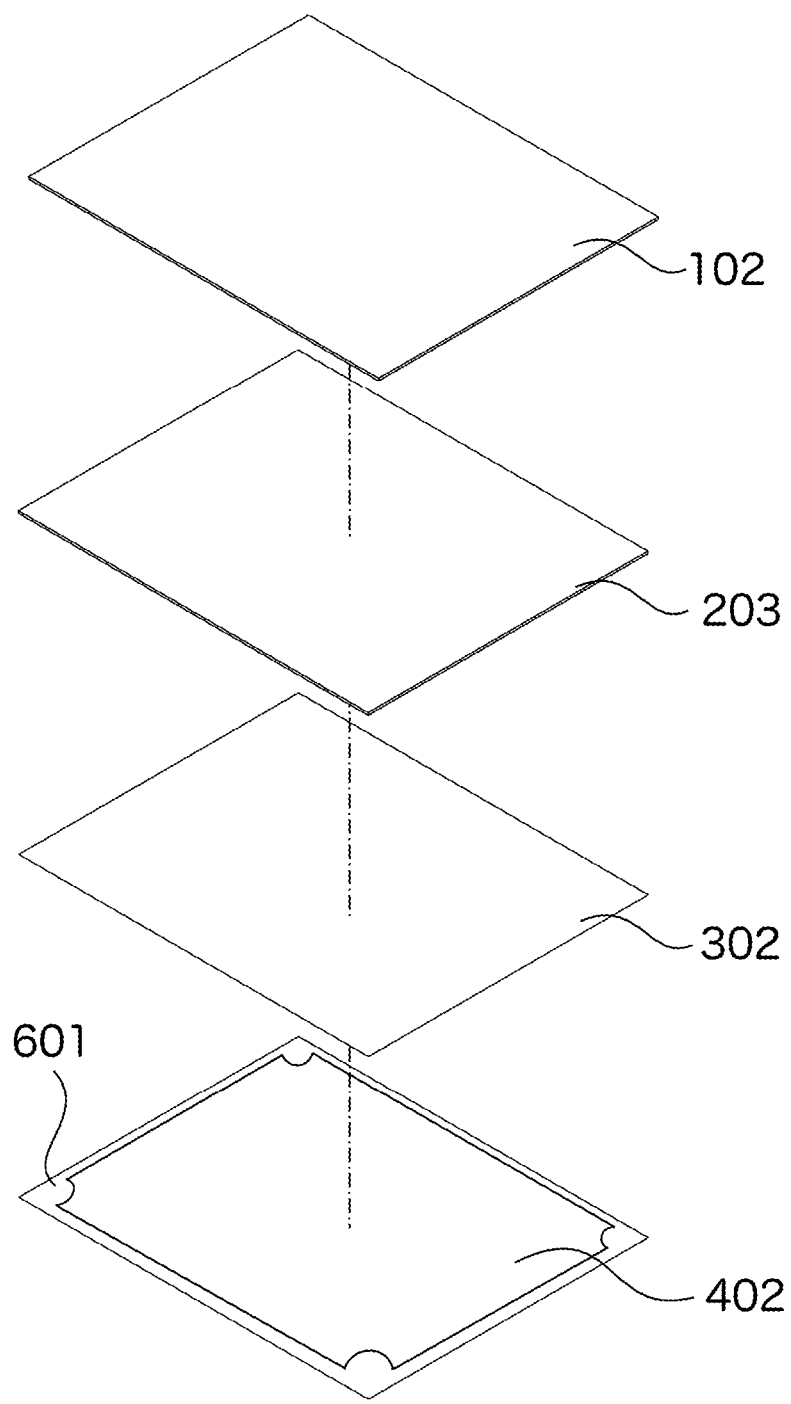
FIG. 5 shows an exploded view of a disposable liquid-binding floor mat in a shape of a rectangle, according to the present invention.
Figure 6:
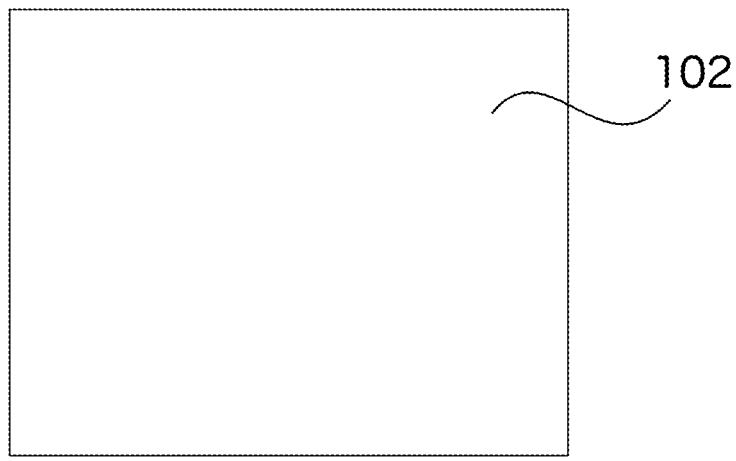
FIG. 6 shows a top view of the disposable liquid-binding floor mat in a shape of a rectangle, according to the present invention.

Referring to FIG. 3 and FIG. 4, it shows an exploded view and a top view of another embodiment of the disposable liquid-binding floor mat in a shape of a round rectangle, according to the present invention. The method of implementation is the same as that in FIG. 1, with the difference that the water absorption layer 202 is composed of a hydrophilic thin plate and the area of the water absorption layer 202 is equal to that of at least one of the water penetration layer 101, the water-proof layer 301 or the self-adhesive layer 401. FIG. 5 and FIG. 6 show an exploded view and a top view of the disposable liquid-binding floor mat in a shape of a rectangle, according to the present invention. The method of implementation is the same as that in FIG. 3, and the difference is that the floor mat is a rectangle with a non-opened edge end, whereas the water absorption layer 203 is composed of a hydrophilic thin plate. The area of the water absorption layer 203 is equal to that of at least one of the water penetration layer 102, the water-proof layer 302 or the self-adhesive layer 402. Furthermore, in FIG. 3 and FIG. 5, the area surrounding the edge is a corner-intensified area 601 on which the self-adhesive coating is intensified, thereby enhancing the adhesive force of the floor mat, so that the floor mat will not be lifted up by external force.

Figure 7:
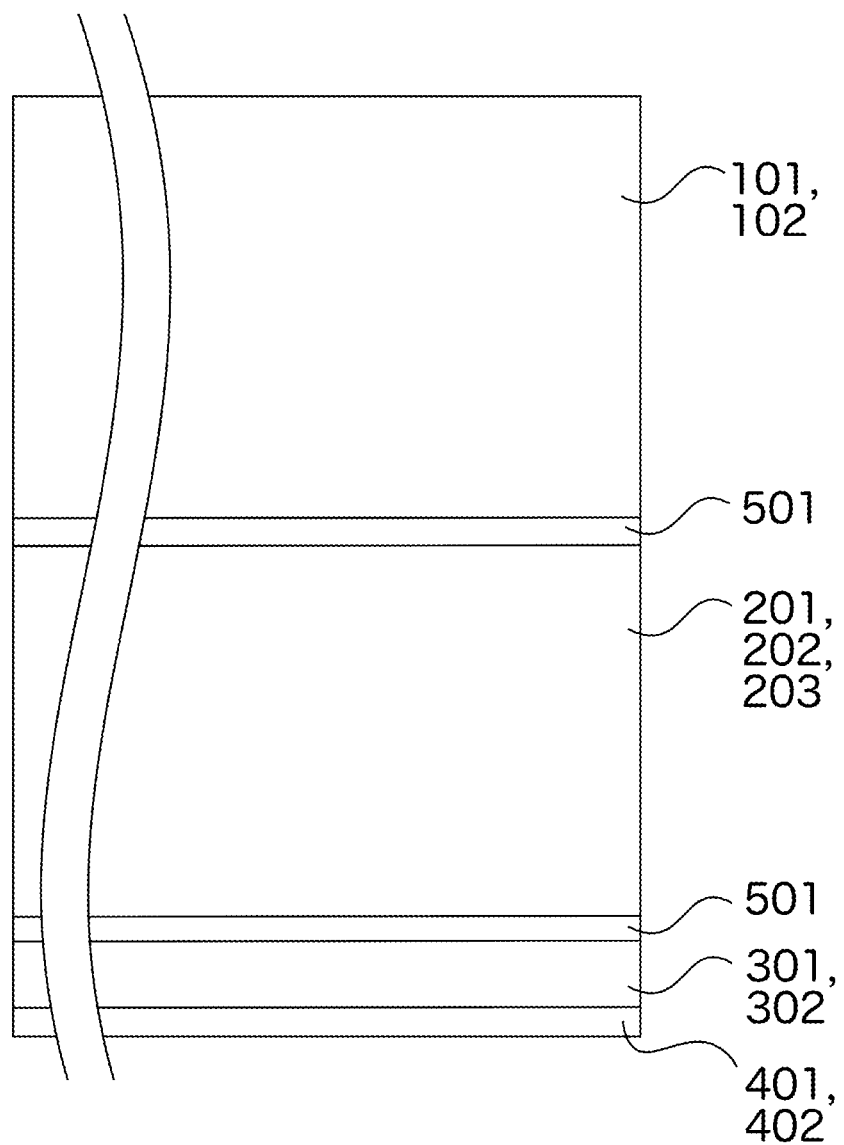
FIG. 7 shows a sectional view of the disposable liquid-binding floor mat, according to the present invention.

Referring to FIGS. 1 to 6, along with FIG. 7 showing a sectional view of the disposable liquid-binding floor mat according to the present invention, the water penetration layer 101, 102, the water absorption layer 201, 202, 203, the water-proof layer 301, 302 and the self-adhesive layer 401, 402 are bonded as an integral structure, with a structural adhesive layer 501 being disposed between the layers. The structural adhesive layer 501 is a partially or fully molten structure or an adhesive structure. FIG. 7 discloses that the structural adhesive layer 501 is disposed between the water penetration layer 101, 102 and the water absorption layer 201, 202, 203, as well as between the water absorption layer 201, 202, 203 and the water-proof layer 301, 302. In addition, the self-adhesive layer 401, 402 is selectively coated on one surface of the water-proof layer 301, 302 to bond the disposable liquid-binding floor mat of the present invention into an integral structure.

To facilitate further understanding the practical scenario of application of the present invention, a urinal in a men's room is used as an example of application. The disposable liquid-binding floor mat in FIG. 1 of the present invention is paved in front of the urinal, with an arc-shaped opening abutted at the place where the urinal stands to yield from a change in the shape of the urinal. As the water penetration layer 101 is provided with a dark camouflage pattern, it results in a visual effect that the urine or watermarks falling on the surface of the water penetration layer 101 will not be found out easily. The so-called camouflage pattern can use the printed method or the union method, allowing the surface of the water penetration layer 101 to manifest an interlaced figure. The interlaced color is between the color when the surface of the water penetration layer 101 gets wet and the color when the surface of the water penetration layer 101 gets dry, so as to reduce the sense of dirtiness. In addition, the primary tone of the surface color of the water penetration layer 101 is dark, so as to intensify the visual effect that the user will not observe and find out traces of watermarks easily. Furthermore, the liquid can be guided into the middle water absorption layer 201 successfully, allowing the liquid to be absorbed in the water absorption layer 201. If there is too much liquid that it overflows to the lower water-proof layer 301, then the liquid can be blocked without leaking toward the floor by the water-proof film. A lower side next to the water-proof layer 301 is provided with the self-adhesive layer 401 which is self-adhesive and skid-proofing, to facilitate paving and prevent the user who steps on the floor mat from skidding and getting hurt.

The present invention provides a disposable liquid-binding floor mat and is characterized in that it is cleaned easily, paved easily, pretty and compact, and is not kicked off by the user easily due to the low difference in height, which is different from the prior arts and is no doubt provided with novelty, advancement and practicality.

Accordingly, the specific floor mat structure disclosed by the embodiments of the present invention actually provides the printed pattern on the surface of the water penetration layer to prevent the wet watermarks from being found out easily, the inner water absorption layer to absorb environment liquid, and the bottom water-proof layer and the self-adhesive to isolate liquid and adhere by itself. Furthermore, in terms of the entire structure, the floor mat has not been seen in the similar products and has not been published prior to the application.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A disposable liquid-binding floor mat comprising:
   a water penetration layer, which is a thin piece of non-woven fabric and is superimposed on a water absorption layer;
   the water absorption layer that is made of a hydrophilic thin plate and is superimposed between the water penetration layer and a water-proof layer;
   the water-proof layer that is made of a water-proof film and is superimposed between the water absorption layer and a self-adhesive layer; and
   the self-adhesive layer that is made of a self-adhesive material and is superimposed below the water-proof layer;
   wherein the water penetration layer, the water absorption layer, the water-proof layer and the self-adhesive layer are bonded as an integrated non-sealed edge structure, and a deodorant is added into the water absorption layer,
   wherein the water penetration layer is provided with a printed or mixed dark camouflage pattern, so that a surface of the water penetration layer manifests an interlaced figure, with an interlaced color between a color when the surface of the water penetration layer gets wet and a color when the surface of the water penetration layer gets dry: a primary tone of the interlaced color of the water penetration layer is dark, and the dark camouflage pattern is a cloth-imitation pattern, a floor-tile-imitation pattern, or a carpet-imitation pattern.

2. The disposable liquid-binding floor mat according to claim 1, wherein an area of the water absorption layer is smaller than or equal to that of the water penetration layer, the water-proof layer or the self-adhesive layer.

3. The disposable liquid-binding floor mat according to claim 1, wherein the water-proof film of the water-proof layer is made of water-proof polyethylene, water-proof polypropylene, moisture-permeable and water-proof polyethylene or moisture-permeable and water-proof polypropylene.

4. The disposable liquid-binding floor mat according to claim 1, wherein the self-adhesive material of the self-adhesive layer is a coating on a corner-intensified area, a local area and a full area.

5. The disposable liquid-binding floor mat according to claim 1, wherein the water penetration layer, the water absorption layer, the water-proof layer and the self-adhesive layer are bonded as an integral structure, with a structural adhesive layer being disposed between the layers and the structural adhesive layer being a partially or fully molten structure or an adhesive structure.

6. The disposable liquid-binding floor mat according to claim 1, wherein an appearance of the floor mat is in a shape that an edge end is opened or not opened.

7. The disposable liquid-binding floor mat according to claim 1, wherein the floor mat is a plate or plural floor mats that are rolled into a coil, with a tear line being disposed along the length between two neighboring floor mats.

8. The disposable liquid-binding floor mat according to claim 1, wherein the floor mat is a rectangle or a round rectangle.

9. The disposable liquid-binding floor mat according to claim 1, wherein an aromatic is further added into the water absorption layer.

* * * * *